United States Patent [19]

Laberinti

[11] 3,847,720

[45] Nov. 12, 1974

[54] UPHOLSTERY ARTICLES AND PROCESS FOR THEIR MANUFACTURE

[75] Inventor: Cesare Laberinti, Milan, Italy

[73] Assignee: Industrie Pirella S.p.A., Milan, Italy

[22] Filed: Dec. 8, 1970

[21] Appl. No.: 96,265

[30] Foreign Application Priority Data
Dec. 24, 1969  Italy .................................. 26274/69

[52] U.S. Cl. ............................................... 161/159
[51] Int. Cl. ............................................... B32b 3/26
[58] Field of Search ............................. 161/159, 190

[56] References Cited
UNITED STATES PATENTS

| | | | |
|---|---|---|---|
| 2,994,110 | 8/1961 | Hardy .................. | 161/190 |
| 3,051,601 | 8/1962 | Schick .................. | 161/190 |
| 3,142,855 | 8/1964 | Gilchrist ............... | 161/190 |
| 3,328,225 | 6/1967 | Urbanic et al. ........ | 161/190 |
| 3,565,746 | 2/1971 | Stevens ................. | 161/190 |

Primary Examiner—William J. Van Balen
Attorney, Agent, or Firm—Clelle W. Upchurch

[57] ABSTRACT

A molded upholstery article of expanded polyurethane is formed with an inner core and a preformed polyurethane skin in which the skin is microporous and intimately joined to the inner core. The skin has cells uniformly distributed in its thickness as a fine cellular structure, which cells are for the most part non-intercommunicating, and having a diameter smaller than 0.02 mm. The skin is waterproof and its density is between 0.4 and 0.8.

The process for preparing said molded upholstery article involves coating the mold surface with a thin coat of a first liquid mixture of polyurethane forming substances, then pouring in the so-coated mold a second liquid mixture of polyurethane forming substances without waiting for the components of the first mixture to have completed their reaction. The formation of the expanded foam by its pressure and release of heat controls the final step of the formation of the microporous polyurethane skin and provides an intimate union with it. No heat is provided to the reaction and air at room temperature remains in direct contact with the mold walls.

2 Claims, No Drawings

UPHOLSTERY ARTICLES AND PROCESS FOR THEIR MANUFACTURE

The present invention relates to the manufacture of molded upholstery articles of expanded (foamed) polyurethane and more precisely it concerns those upholstery articles in which an inner core of said cellular material is covered with a preformed external layer of polyurethane constituting the so-called "skin" and joined to said core.

Articles of this kind can be used in furniture, for instance as cushions, backrests, arms for armchairs and chairs, or in motor vehicles, for instance as cushions and backs for seats, protective borders, supporting arms, gaskets for dials, inner and outer body parts, instrument panels and the like.

All of these articles produced in this way can be directly assembled without further coverings or surface treatments. In said articles the pre-formed polyurethane skin joined to the core of expanded polyurethane has both a protective action and an aesthetic function, but because of its thinness, it does not function in the springing action carried out by the core.

As regards its protective action, the skin must have appreciable characteristics of mechanical resistance in spite of its thinness and must be waterproof. As regards its aesthetic function, the skin must have an appealing appearance so as to resemble for instance natural leather or a fabric of the like. In fact, the article provided with said skin is not intended to be covered with further layers arranged on the skin itself.

It has been noted in practice that a pre-formed skin of compact polyurethane joined to the core of expanded polyurethane gives rise to some drawbacks. Several processes for the manufacture of these articles are already known. They are based on the preliminary formation of the outer layer or skin of compact polyurethane in the same mold to be then used for molding the core of expanded polyurethane. The joining of said layer or skin with the core takes place during the molding of the latter, thus obtaining the finished article.

In particular, in upholstery articles having a complex structure, as for instance instrument panels, supporting arms and the like, some defects can be ascertained due to the existence of gaps between the skin and the core of expanded polyurethane. In fact, in consequence of the expansion of the polyurethane foam in the mold, already covered with the layer constituting the skin, air may remain trapped in some areas, in particular at the corners of the mold cavity, thus preventing the polyurethane foam from penetrating completely in those areas.

Even if this defect is concealed by the outer layer or skin, the article is in any case to be considered as defective, not only because of presence of undesired gaps on the inner core, but also because of the consequent lack of continuity noticed in the union between the outer compact layer or skin and the inner core at that point.

It has been noted that in the areas where the joining between the outer layer or skin of compact polyurethane and the inner core of expanded polyurethane is lacking, said outer layer, besides showing a depression, varying therefore the profile of the articles, becomes easily liable to deterioration, both because of its thinness and because of the lack of support by the expanded polyurethane material constituting the inner core. The compact nature of the polyurethane skin increases these drawbacks, since in the collapsed areas the unstretched skin can show visible wrinkles which mark the material and affect its appearance.

On the other hand, the adoption of a relatively great thickness for the skin of compact polyurethane in order to prevent the occurrence of said drawbacks in the areas unsupported by the inner core is not advisable, since in that case the skin of compact polyurethane would have a considerably reduced degree of softness, which would cause an unpleasant feeling to the user.

Upholstery articles are already known in which the preformed skin of polyurethane material is "provided with pores," this expression being adopted for simplicity's sake in this specification to mean that the skin possesses a limited number of cavities of relatively large diameter which are not uniformly distributed within the skin thickness. However, a skin provided with pores does not represent in the art any improvement as regards the above discussed behavior of the pre-formed skin of compact polyurethane.

An object of the present invention is an upholstery article of the above-indicated type, in which the skin of polyurethane, pre-formed in the mold and joined to the core of cellular polyurethane does not give rise to the described disadvantages.

A further object of the invention is to provide a process for the manufacture of said upholstery article.

According to the invention, the upholstery article is characterized in that the pre-formed skin, which is microporous and is intimately joined to the inner core of expanded polyurethane, has cells uniformly distributed in its thickness as a fine cellular structure, said cells being for the most part not intercommunicating with one another (unicellular), and having a diameter smaller than 0.02 mm. Further the skin's visible surface is practically continuous and waterproof and its density ranges between 0.4 and 0.8 gr/cm$^3$. The skin has a value of steam permeability higher than 150 g/1000 mm$^2$/24h (DIN 53.333 Standard).

By virtue of these characteristics, the skin maintains an appreciable degree of softness to the feel even if it has a relatively great thickness. Consequently, it is possible to provide the microporous skin with a relatively great thickness, for instance up to 3 mm, in order to prevent the occurence of wrinkles at possible gaps between the inner core and the skin, without any concern as to the softness of the skin. Moreover, when the microporous skin of relatively great thickness is curved to follow an analogous profile of the inner core covered by it, compression and tension stresses take place in the material itself in the areas corresponding to underlying gaps brought about by defects of processing. Said compressions on one side and tensions on the other side impart to the microporous skin a certain consistency, which is found to be particularly useful in correspondence with said underlying gaps.

For the manufacture of the upholstery article, a process is provided, characterized by the following steps:

applying on the mold at room temperature a thin coat of a first liquid mixture which is free from diluents and which comprises reactive substances able to form a layer or skin of self-cross linked microporous polyurethane, which comprises: at least one polyfunctional polymeric substance containing at least two active hydrogen atoms; at least one polyfunctional compound of low molecular weight having at least two active hydrogen atoms; at least one foaming agent; at least one pore controlling agent; at least one organic polyisocyanate; at least one catalyst capable of activating, without the application of heat from the outside, the reaction of the polyisocyanate with the compounds containing active hydrogen atoms and at least one pigment;

pouring in the so treated mold a second liquid mixture of reactive substances able to form self-cross-linked expanded polyurethane, which is intended to fill the mold and to constitute the inner core of the article, said second mixture being poured immediately after the application of the first mixture and without waiting for the components of the first mixture to have completed their reaction with formation of a completed layer;

closing the mold;

allowing the reaction in the second mixture to take place, with the formation of a polyurethane foam filling the mold and with heat generation, said foam expansion and heat controlling the final step of the formation of the microporous polyurethane and of the intimate union between it and the core, the elongation and the cross-linking of the polyurethane chains of the materials of said two parts taking place without any application of heat from the outside, while air at room temperature remains in direct contact with the mold walls;

opening the mold to remove the finished article.

The following substances can be used for the formation of the skin.

The polymeric material containing at least two atoms of active hydrogen can be any polyester polyol or any polyether polyol having a molecular weight of about 600 to about 7000. Particularly suitable are polytetramethyleneglycol or polypropyleneglycol or a mixture thereof.

The polyfunctional compounds of low molecular weight having at least two active hydrogen atoms can advantageously be glycols, as for instance 1-4 butanediol.

The organic polyisocyanate can be any aliphatic diisocyanate, or any aromatic diisocyanate. Diphenylmethanediisocyanate, alone or in combination with an aliphatic diisocyanate, is preferably used.

For the formation of the microporous skin in accordance with the present invention, one or more liquid foaming agents, known in the art for foaming the reacting mixture, are previously added to the first reaction mixture.

Said liquid foaming agents include also the halogenated hydrocarbons having a boiling point lower than 100°C. Of course, said foaming agents reach their boiling point in consequence of the increase of the reaction temperature.

By way of example, methylene chloride is indicated as a liquid foaming agent having a boiling point slightly over the room temperature. However, also other liquid hydrocarbons such as trichloromonofluoromethane are suitable for this purpose.

Silicone oil proves very appropriate as the pore controlling agent.

The catalyst can be an amine, as for instance triethylenediamine or a tin catalyst or a mixture thereof. By virtue of such catalysts which confer the self-cross-linking character to the reaction mixture the reaction takes place rapidly without the need of external heat.

The pigment can be carbon black, in order to impart a black color to the skin.

The components of the second liquid reaction mixture, also free from diluents, can belong to the same classes as those indicated for the first reaction mixture, of course excluding the pigment. Like the first reaction mixture, the second reaction mixture is also of the self-cross-linking type, namely contains a highly efficient catalyst, able to ensure the activation of the elongation reaction and of the cross-linking reaction of the polyurethane chains without the application of external heat to the formed mass of expanded polyurethane.

For the molding of a pre-formed polyurethane skin it is already known to use molds of synthetic resin, namely of a material having a very low thermal conductivity. To carry out the present invention, it is possible to use molds of synthetic resin, for instance polyester resin, epoxy resin, silicone rubber or others.

However, the present invention can be carried out also with a metallic mold, for instance an electroplated mold.

The mold comprises a lid, generally flat, or is constituted by a lower portion and by an upper portion, both shaped. The inner surface of the mold can be provided with engravings in order to reproduce leather or fabrics or other ornamental effects.

The first reaction mixture, namely the one forming the skin, is applied on the mold for instance by spraying, spreading or the like.

If desired the application of only one coat may be sufficient. If necessary said coat is applied also to the mold lid. The first reaction mixture is free from solvents, since its components are such as to be in a low viscosity liquid state or a part of them is dissolved or dispersed in the remaining part.

If the mold comes directly from a prior processing cycle, at least its inner surface may remain still heated because of the exothermic reaction which has occurred in the mold. In that case, the temperature of the inner surface of the mold must be brought down to room temperature before applying on the mold the first reaction mixture, namely the one intended to form the skin.

The second reaction mixture, namely the one forming the inner core of the article, is poured into the mold immediately after the application on the mold of the first reaction mixture, without waiting for the components of the first mixture to have completely reacted, i.e., formation of a completed layer.

In fact, owing to the thinness of the layer of the first reaction mixture applied on the mold, the reaction started between the relative components which is of exothermic nature does not generate heat in an amount sufficient to compensate for the heat loss toward the outside. As no application of external heat is provided, said reaction cannot generate the amount of heat necessary to complete the setting of the formed layer.

After being poured into the mold immediately after the application of the first reaction mixture, the second reaction mixture forms a relatively large mass in the mold. The components of the second reaction mixture start their reaction, going on to generate heat which is supplied to the pre-formed layer situated at the mass periphery. An interaction takes place at this moment between the reagents of the first mixture, which have not yet been placed in condition for complete reaction but which are still liable to react, and those of the second mixture which form the expanded polyurethane mass constituting the inner core of the article; said interaction results both in a quick completion of the setting of the layer forming the skin and in an intimate and permanent joining between said layer and said core.

During the whole processing cycle, namely from the application of the first reaction mixture to the removal of the finished product from the mold, the latter is not heated from the outside in any way. In this time interval, the mold is allowed to stand at room temperature, without the need of transferring it elsewhere during the operating cycle. As the mold is merely a container formed by molding walls, its outer face being in direct contact with the room air, there need not be provided thermal insulation for the walls of the mold used according to the present invention.

After the elongation reaction and the cross-linking reaction of the expanded polyurethane mass and of the microporous polyurethane skin, the mold is opened and the finished article, provided with the skin, is removed from it.

In order to more fully illustrate the present invention the following examples are presented which are not to be considered as limiting.

EXAMPLE 1

The article to be manufactured is a padded car dashboard (instrument panel). As a model, a wooden dashboard covered with real leather was used, and from this the die in polyurethane elastomer, cross-linked at room temperature, was obtained. This die is coupled with a rigid frame in fibre-glass reinforced resin to form the mold.

An anti-adhesive substance, comprising conventional silicone resin, is applied to the internal surface of the mold. Subsequently on said surface, which is maintained at room temperature, the first polyurethane mixture is sprayed. This mixture is composed of:

|  | Parts |
|---|---|
| Polytetramethyleneglycol (molecular wt. 2000) | 50 |
| Polytetramethyleneglycol (molecular wt. 1000) | 50 |
| 1-4 Butanediol | 6 |
| Water | 0.1 |
| Silicone Oil L-532* | 0.5 |
| Triethylenediamine | 0.33 |
| Pigment | 2.4 |
| Diphenylmethanediisocyanate | 46 |

The quantities are expressed as parts by weight per 100 parts of polyether polyols.
*Sold by Union Carbide This first mixture, which is sprayed, deposits itself evenly so as to form a layer. Reacting this mixture, the polyurethane obtained acquires a microporous structure of a gradually accentuated consistency while the mold is kept at room temperature. Within one minute from the end of spraying the second polyurethane mixture is poured into the mold. This mixture is composed of:

| Desmophen 3900[1] | 100 | parts |
|---|---|---|
| Voranol RA-800[2] | 12 | parts |
| Water | 1.5 | parts |
| Tetramethylbutanediamine | 1 | part |
| Methylene chloride | 3 | parts |
| Diphenylmethanediisocyanate | 56 | parts |

The quantities are expressed as parts in weight per 100 parts of "Desmophen".
[1] A polyether triol (molecular weight 4800) sold by Farbenfabriken Bayer.
[2] A polyether tetrol (molecular weight 800) sold by Dow Chemical.

The mold is closed with the lid which bears a suitable metallic reinforcing insert for the resulting dashboard. After allowing for the reactions within the first mixture and within the second mixture and also between the same, to complete in 10 minutes, thus also permitting the polyurethane of the second mixture to expand and fill the mold, the finished article is removed from the mold. The molded dashboard has the surface appearance and surface softness of real leather. The skin has an even microporous structure within the thickness, the latter 0.7 mm as a middle value. The pores have a diameter of around 0.01 mm.

After being subjected to temperature resistance tests (up to 120°C and down to −40°C), skin-expanded core bond tests and abrasion tests, the product meets current standards.

EXAMPLE 2

The article to be manufactured is an armchair backrest. A rigid model covered with real leather was used, and from this two dies in RTV silicone rubber were obtained which reproduced the grain of the leather covering. The two dies were then fitted to rigid frames in a fibre-glass reinforced synthetic resin to obtain the corresponding mold parts. To one of the mold parts, at a suitable distance from the surface of the die, a reinforcing rigid frame is fixed for the backrest, which remains embedded in the finished article. On the internal surface of the two mold dies is sprayed the first polyurethane mixture composed of:

| Polytetramethyleneglycol (molecular weight 2000) | 100 | parts |
|---|---|---|
| Water | 0.1 | parts |
| 1-4 Butanediol | 6 | parts |
| Silicone Oil L-532* | 0.5 | parts |
| Silicone Oil L-520* | 0.2 | parts |
| Dibutyltindilaurate | 0.3 | parts |
| Triethylenediamine | 0.3 | parts |
| Pigment | 2 | parts |
| Antioxidant | 0.5 | parts |
| Diphenylmethanediisocyanate | 34 | parts |

The quantities are expressed as parts by weight per 100 parts of polyether polyol.
*Sold by Union Carbide The mixture was evenly sprayed on the two die surfaces and within a maximum of 2 minutes from the beginning of the application of the first mixture, the second polyurethane foaming mixture was poured into the mold. This is composed of:

|  | Parts |
|---|---|
| Desmophen 3900 | 100 |
| Water | 2.5 |
| Amino Catalysts[1] | 1.6 |
| Dispersant | 1 |
| Mixture of toluenediisocyanante (80:20) with diphenylmethanediisocyanate at a ratio of 60:40 | 40 |

The quantities are expressed as parts by weight per 100 parts of "Desmophen".

The mold is closed and left for 10 minutes after which the molded backrest is removed. This article is then passed through a mangle to even out the cellular structure of the expanded core. At an inspection carried out 72 hours after manufacture, the surface layer of polyurethane forming the skin of the molded article having a middle thickness of mm. 1, displayed the following properties:

| | |
|---|---|
| Density | 0.66 |
| Hardness | 46 Shore A |
| Tensile strength: | 800 gr/mm$^2$ |
| Ultimate Elongation | 600% |
| Steam permeability (DIN 53.333 standard) | 190 gr/1000mm$^2$/24h |
| Taber abrasion (Mole H-22, 1 kg load) | 180 mg at 2000 cycles |
| $^1$A mixture of: triethanolamine | 1 part |
| triethylamine | 0.2 parts |
| tetramethylbutanediamine | 0.2 parts |
| triethylenediamine | 0.2 parts |

EXAMPLE 3

The article to be manufactured is a cushion for car seats. For the production of the mold, which is of epoxy resin, the procedure described in Example 2 should be followed, except for the fact that the mold has a lid which is not to be covered. After having applied an anti-adhesive substance to the mold, the first polyurethane mixture is sprayed on, composed of:

| | | |
|---|---|---|
| Ethylenepropyleneglycol adipate (molecular wt. 2000) | 100 | parts |
| 1-4 Butanediol | 3 | parts |
| Methylene chloride | 2 | parts |
| Silicone Oil L-532* | 1 | part |
| Dibutyltindilaurate | 0.01 | parts |
| Pigment | 2 | parts |
| Antioxidant | 0.5 | parts |
| Diphenylmethanediisocyanate | 32 | parts |

This first mixture is sprayed evenly on the internal surface of the mold in order to form a layer. Within 2 minutes from applying this first polyurethane mixture, the second is poured into the mold, its composition being as described in Example 2. The mold is closed, and after the chemical reactions have taken place, the molded cushion is extracted. The external skin of the cushion, which is formed from the first mixture and has a middle thickness of 1 mm, has the following characteristics:

| | |
|---|---|
| Density | 0.8 |
| Tensile Strength | 980 gr/mm$^2$ |
| Ultimate elongation | 400% |

*Sold by Union Carbide

What we claim is:

1. An upholstery article of expanded polyurethane molded in a shape of any desired configuration, constituted of an inner core of said polyurethane and of a preformed polyurethane skin which is mechanically resistant and which presents an appealing appearance, wherein said skin is microporous and is directly joined to said inner core by chemical bond, has cells uniformly distributed within its thickness in a fine cellular structure, said cells being for the most part not intercommunicating with one another, and having a diameter smaller than 0.02 mm, the visible surface of said skin being substantially continuous and waterproof and the value of the density range of said skin being between 0.4 and 0.8 g/cm$^3$, said skin being further characterized by having a pleasing softness to the touch and a thickness of no more than 3mm.

2. A molded upholstery article as defined in claim 1, wherein the skin has a value of steam permeability higher than 150 gr/100 mm$^2$/24h (DIN 53.333 Standard).

* * * * *

UNITED STATES PATENT OFFICE
CERTIFICATE OF CORRECTION

PATENT NO. : 3,847,720
DATED : November 12, 1974
INVENTOR(S) : Cesare Laberinti

It is certified that error appears in the above-identified patent and that said Letters Patent are hereby corrected as shown below:

Item [73] should read as follows:

--- Assignee: Industrie Pirelli S.p.A., Milan, Italy ---.

Column 8, Claim 2, lines 3 and 4, change "150 gr/100 mm$^2$/24h (DIN 53.333 Standard) to read --- 150 gr/1000 mm$^2$/24h (DIN 53.333 Standard) ---.

Signed and sealed this 24th day of June 1975.

(SEAL)
Attest:

RUTH C. MASON
Attesting Officer

C. MARSHALL DANN
Commissioner of Patents
and Trademarks